United States Patent [19]

Okuyama

[11] Patent Number: 5,946,298
[45] Date of Patent: Aug. 31, 1999

[54] DIGITAL INTERFACE WHICH INSERTS A TRANSFER RATE VALUE INTO A PACKET HEADER AND CONTROLS ACCESS TO A BUS BASED ON A TOTAL TRANSFER RATE

[75] Inventor: Takehiko Okuyama, Kanagawa-ken, Japan

[73] Assignee: Kabushiki Kaisha Toshiba, Kawasaki, Japan

[21] Appl. No.: 08/626,143

[22] Filed: Apr. 5, 1996

[30] Foreign Application Priority Data

Apr. 6, 1995 [JP] Japan .................................. 7-081548

[51] Int. Cl.[6] .............................. H04J 1/16; H04J 3/14; H04L 1/00; H04L 12/26
[52] U.S. Cl. ........................... 370/232; 370/253; 370/362
[58] Field of Search .................................... 370/232–234, 370/253, 462, 402, 458, 459, 461, 362, 442; 395/200.83

[56] References Cited

U.S. PATENT DOCUMENTS 4,779,267  10/1988  Limb ........................................ 370/94

FOREIGN PATENT DOCUMENTS 5-91341    4/1993   Japan .
6-98311    4/1994   Japan .
6-338918  12/1994  Japan .
7-212399   8/1995   Japan .

OTHER PUBLICATIONS

P1394 Standard for a High Performance Serial Bus, IEEE Standards, P1394, Draft 8.0v4, Nov. 21, 1995 (pp. 99–180 and 207–384).

P1394 Standard for a High Performance Serial Bus, IEEE Standards, P1394 Draft 8.0v4 Nov. 21, 1995, Partial Copy.

Kunzman et al., "1394 High Performance Serial Bus: The Digital Interface for ATV", Reprinted with Permission of the IEEE, presented at the International Conference on Comsumer Electronics, Chicago, ILL. Jun. 1995.

Hoffman et al., "IEEE 1394: A Ubiquitous Bus", Presented at COMPCON Spring 1995, San Francisco, CA.

*Primary Examiner*—Douglas W. Olms
*Assistant Examiner*—David R Vincent
*Attorney, Agent, or Firm*—Pillsbury Madison Sutro LLP

[57] ABSTRACT

A transfer-rate computing component computes a transfer rate of an output from a digital video tape recorder component to output the same through a packet conversion component. Child units, which are newly connected to a bus, output data of the transfer rate subsequent to a request command of a bus use right. A total transfer-rate computing component of a parent unit computes a total transfer rate of the data which are transmitted through the bus. An arbitration control part judges whether or not the total transfer rate exceed the maximum transfer rate which is set in the bus. Only when the total transfer rate does not exceed the maximum transfer rate, a command transmission component issues a bus use permission right, to accept the transmission of data from newly connected child units. In this manner, when a new unit or device is connected to the bus and also when connection of the bus is turned off, synchronous transfer is assured.

15 Claims, 18 Drawing Sheets

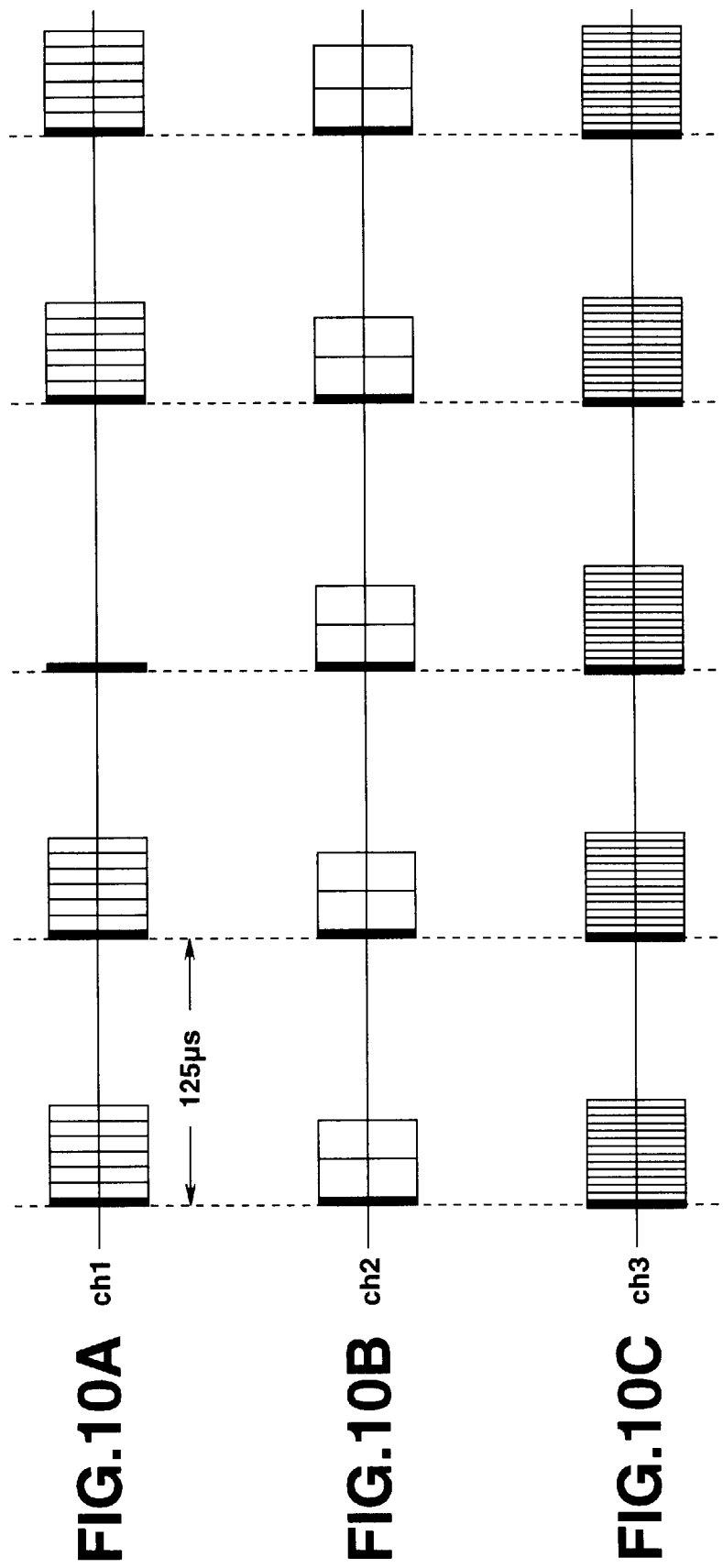

DIGITAL INTERFACE WHICH INSERTS A TRANSFER RATE VALUE INTO A PACKET HEADER AND CONTROLS ACCESS TO A BUS BASED ON A TOTAL TRANSFER RATE

BACKGROUND OF THE INVENTION

1. Field of the Invention

The invention relates to a digital interface device and a digital interface method, which multiplex a plurality of data upon each other so as to be able to execute synchronous transfer.

2. Related Art Statement

In recent years, digital processing of an image has been considered. Various digital processing devices and methods have also been considered regarding a magnetic recording and reproducing apparatus of digital image data. For example, in a conference discussing a digital VTR (video tape recorder) for public welfare in Japan, digital signal standards were decided, such is an SD standard for compressing an NTSC signal, a PAL signal or the like and for recording the same, and an ED standard for compressing a base band signal of an HDTV (High Definition TV) and for recording the same. The digital VTR for public welfare which corresponds to these standards has been widely sold.

Generally, when a video signal is digitalized, the amount of information contained in the signal greatly increases, and it becomes difficult to execute transmission, recording or the like without compressing the information, in view of a communication rate, expense or the cost. For this reason, in the transmission and recording of the digital video signal, an image compression technique is essential, and various kinds of standardizing proposals have been considered in recent years. As one example, for animation, an MPEG (Moving Picture Experts Group) system has been standardized.

Particularly, an MPEG 2 system has been widely used as a standardization system for image compression, and has been adopted in digital broadcasting in the U.S.A. and Europe. A decoder which corresponds to the MPEG standard has also been sold. The decoder is supplied as an MPEG decode board, and is loaded onto a computer or the like.

In keeping with growth of the image compression technique, development of digital imaging equipment has also progressed. Not only the digital VTR, but also a decoder for digital broadcasting (digital set top box), and a digital video disc player have been sold.

The advantages to digitization include reduction in depletion or deterioration in the transmission and recording, and obtaining a reproduced image of high quality. If these characteristics are considered, all digital imaging units should be arranged to have a digital interface which not only enables analog input and output similarly to conventional equipment, but also which enables input and output of the digital signal. The digital interface may also treat the image data merely as digital data. Thus making it possible to connect equipment having the digital interface to a computer, not-withstanding the fact that the digital and analog units may be connected to each other to transmit the data.

FIG. 11 is a block diagram showing the related technique of a digital interface device which is used in a digital VTR.

The block diagram in FIG. 11 applies to a VTR which uses the standard of the above-described conference of the digital VTR for public welfare and is arranged to record the standard television image after it is digitalized so that an amount of data has been compressed to about ⅕ to ⅙. In the 6 mm digital tape format adopted in the igital VTR, it is also possible to record digital data other than the image. Accordingly, the recording capacity of a 6 mm digital tape is much larger than that of a DAT (digital audio tape), or a tape recorder in the 8 mm format. Since the recording area of video data in a single magnetic tape has a recording capacity of 50 Giga bytes, application as a high capacity digital data streamer is expected in the future.

An analog image signal is input to input terminal 1. This analog image signal is converted to a digital signal by an A/D transducer 2. The A/D transducer 2 changes sampling frequency with respect to an intensity or luminance signal Y and color-difference signals Cr and Cb, to output a component signal of 4:1:1 to a compression circuit 3. The compression circuit 3 compresses the component signal, which is inputted by DCT processing, quantization processing and variable-length coding processing. Thus, an input analog image signal in which a transmission rate is 125 Mbps is converted to 19 Mbps and is supplied to a correction or revision coding circuit 4. The revision coding circuit 4 adds an error correction code to the inputted compression data. An output rate of the revision coding circuit 4 is 25 Mbps. A modulation circuit 5 modulates an output from the revision coding circuit 4 to a code which is suitable for magnetic recording, to give the same to an unshown head through an amplifier 6, to thereby magnetically record the same onto a tape 7.

Meanwhile, in a reproducing system, a reproducing signal which is reproduced from the tape 7 by the unshown head is supplied to an equalization detection modulation circuit 9 through an amplifier 8. By the equalization detection modulation circuit 9, the reproduced signal is quantized in waveform and is modulated. The reproduced signal is corrected in error and is given to an extension circuit 11 by a revision decoding circuit 10. The extension circuit 11 extends reproduced data by variable-length decoding processing, inverse quantization processing and inverse DCT processing, to give the same to a D/A transducer 12. The D/A transducer 12 returns the digital signal to an analog signal to output the same through an output terminal 13.

Moreover, in the digital VTR in FIG. 11, it is also possible to record another digital data other than the image data. Specifically, the digital data supplied at terminal 15 passes to the revision coding circuit 4 through a digital I/F (interface) 14. An error revision code is added to the digital data by the revision coding circuit 4, the data is modulated by a modulation circuit 5 and, thereafter, is recorded onto the tape 7. Furthermore, upon reproduction, the digital data from the revision decoding circuit 10 are outputted from the terminal 15 through the digital I/F 14. Since the digital I/F 14 executes transfer of the data not through the compression circuit 3 and the extension circuit 11, no image deterioration or degradation is caused by compression or extension. In this configuration, the input and output transfer rate of the digital I/F 14 is 25 Mbps.

FIGS. 12 to 14 are explanatory views for describing the recording format of the tape 7.

FIG. 12 shows a recording track which is formed on the tape 7, while FIG. 13 shows each data region of one (1) track. As shown in FIGS. 12 and 13, each recording track has a plurality of regions, which correspond to the kinds of data, that is, an ITI, an audio region, a video region and a sub-code region. These regions are successively arranged from a lower end of the tape 7 toward an upper end thereof. Further, gaps G1 to G3 are provided respectively between these regions. By trace of the head, the ITI, the audio region, the video region and the sub-code region are successively recorded and reproduced.

The arrangement is such that, in an SD format of the digital VTR for public welfare, data are recorded onto each track with a one (1) sink block serving as a recording unit. FIG. 14 shows a data arrangement of the sink block in the video region in the one (1) track. As shown in FIG. 14, each sink block is a length of 90 bytes. A synchronous signal (SYNC) of two (2) bytes is arranged at the head, and an ID of three (3) bytes is subsequently provided. Data of 77 bytes are subsequently arranged. Lastly, a parity which consists of an inner code and an outer code is arranged. An outer code for error revision is arranged in one hundred and fifty seventh to one hundred and sixty seventh sink blocks with respect to longitudinal data in FIG. 14, while an inner code for error revision is arranged in eighty second to eighty ninth bytes of nineteenth to one hundred and sixty seventh sink blocks with respect to lateral data.

FIG. 15 is a block diagram showing a related technique of the digital interface device which is used in a case where two digital VTRs 31 and 32 are connected to each other.

Audio and video processing circuits 33 and 34 correspond to the A/D transducer 2, the D/A transducer 12, the compression circuit 3 and the extension circuit 11 in FIG. 11. The audio and video processing circuits 33 and 34 compress audio and video data to output the same, and extend inputted compression data to output audio data and video data. Error revision circuits 35 and 36 correspond respectively to the revision coding circuit 4 and the revision decoding circuit 10 in FIG. 11. The error revision circuits 35 and 36 add error revision codes to the outputs from the audio and video processing circuits 33 and 34, and revise in error the reproduced signal from the magnetic tape to output the same to the audio and video processing circuits 33 and 34.

Digital I/Fs 37 and 38 correspond to the digital I/F 14 in FIG. 11, and execute conversion between the recording format and the transmission format of the magnetic tape. The video data are recorded onto a video region of one hundred and thirty five sink blocks per one (1) track (refer to FIG. 14), and the audio data are recorded onto the audio region of nine (9) sink blocks. The digital I/F 37 and 38 are so arranged as to make one (1) sink block to one (1) packet, and to convert one (1) track to a unit of one hundred and fifty (150) packets to execute input and output of the data in 150 packets.

FIG. 16 shows the packet data corresponding to one (1) track. As shown in FIG. 16, a header packet HO is arranged at the head of one hundred and fifty (150) packets. Subsequently, two sub-code packets SC0 and SC1 and three video auxiliary packets VA0 to VA2 are arranged. Subsequently, nine (9) audio packets A0 to A8 corresponding to nine (9) sink blocks and one hundred and thirty five (135) video packets V0 to V134 corresponding to one hundred and thirty five (135) sink blocks are arranged.

FIG. 17 shows a data structure of an output from the digital I/Fs 37 and 38. A block diagram in FIG. 17 corresponds to the packet in FIG. 16. Specifically, a block 0 to a block 149 correspond to data of one hundred and fifty (150) packets of one (1) track. As shown in FIG. 17, in each block, an ID is arranged at the head, and various kinds of data are subsequently arranged. A header, a sub-code, video auxiliary data and audio and video data, for one (1) track are transmitted by the block 0 to the block 149. The one (1) frame is restored by the data of n track.

In this manner, the data transmission by the digital I/Fs 37 and 38 is executed in a unit of packet. In the digital interface device, in order to enable data transfer between all digital image equipment and computers, it has been considered to adopt a unified interface system. Specifically, to make communication possible not only between the digital image equipment, but also in a computer system, it has been considered to adopt the standard of SCSC or RS232. However, the transmission rates of SCSI and RS232 are extremely low, and it is impossible to transmit image data at rates equal to or more than several Mbps. Furthermore, the image data are different from the computer data, and must be transmitted (hereinafter referred to as "synchronous transmission") at real time and at constant periods of time. These interface systems therefore cannot be adopted for image transmission.

In view of the above, in the conference of the digital VTR and in section R4.1 of E1A from the conference of ATV (Advanced TV) decoder of U.S.A., a high-speed interface system which is suited to the image data has been considered. Particularly, attention is paid to P1394 which has the function of isochronous transfer (hereinafter also referred to as "synchronous transfer"), as a post SCSI.

FIG. 18 and FIGS. 19A–19E are explanatory views for describing the interface system of P1394 Which is capable of such synchronous transfer and multiplex transfer of a plurality of channels.

Regarding P1394, the contents thereof are described in detail on pages 152–163 of the article (Literature 1) "Comparison of New Three Interfaces which search for a Design Idea of Post SCSI" of Nikkei Electronics 1994. 7.4 (No. 612). As published on and subsequent to page 161 of the article, P1394 is based on an interface for a computer. However, in view of the fact that it is characterized as to be "provided with the isochronous transfer function for multimedia", P1349 is more effective for image data than the other interface systems.

Moreover, in P1394, as described on and subsequent to page 162 of Literature 1, multi-channeling is possible. FIGS. 19A–19E show an example in which a bus corresponding to P1394 (hereinafter referred to as "P1394 bus") is utilized to transmit data of two (2) channels including channels 1 and 2 (CH1 and CH2). P1394 can adopt topologies in the form of a daisy chain and in the form of a tree. FIG. 18 shows an example in which a plurality of devices A to D are connected to each other in the form a daisy chain through a P1394 cable 40 that is the P1394 bus. In this connection, the devices A to D may be digital VTRs.

FIGS. 19A–19E show an example wherein data are transmitted to the device C from the device A, and the data are transmitted to the device D from the device B. For example, it is assumed that a dubbing output from the device A is recorded in dubbing by the device C, and a dubbing output from the device B is recorded in dubbing by the device D. In P1394, the data are transferred at the isochronous cycle every 125 μs.

FIG. 19A shows a video stream of the dubbing output from the device A. The dubbing output is transferred every isochronous cycle. Moreover, FIG. 19C shows a video stream of the dubbing output from the device B. The dubbing output is also transferred every isochronous cycle. A plurality of channels are allocated to the isochronous cycle. A channel number which indicates by any of channels the output is transferred is inserted into the packets which are outputted by the devices A and B. It is indicated in FIG. 19E that the output packet of the device A is transmitted by the channel 1 (ch1), and the output packet of the device B is transmitted by the channel 2 (ch2).

Furthermore, the devices A and B output commands shown respectively in FIGS. 19B and 19D, through a P1394 cable. These video streams and commands are multiplexed upon each other every isochronous cycle, as shown in FIG. 19E, and are transferred by the P1394 cable 40. In this connection, asynchronous data such as a command or the like are multiplexed onto gaps between synchronous data (video data), as shown in FIG. 19E, and are transmitted.

Meanwhile, the devices C and D judge transfer data to be received, from the channel number within the packets which are transferred through the P1394 cable 40 to execute receiving of the transfer data. Specifically, the device C receives the transfer data of the ch1, and the device D receives the transfer data of the ch2.

P1394 has the function of automatically setting topology (refer to "Automatic Setting of Topology" on pages 155–159 of Literature 1). P1394 is so arranged as to reset setting of bus upon connection and disconnection of the devices or upon turning-on of a power supply. By resetting of the bus, confirmation of connection relationship among the devices, setting of parentage among the devices, ID setting of each of the devices, and the like are reset.

Such bus resetting operation does not particularly become a problem in a case where the asynchronous data such as computer data are transferred. However, in a case where the image data in which the isochronous transfer is necessary are transferred, the bus resetting operation becomes a problem. Since the isochronous transfer is not assured by the bus resetting, there is also a case where image display stops in a case where, for example, image data are outputted to a monitor so that the image is in the process of being outputted. Moreover, in a case where dubbing recording due to a VTR is executed, if it is considered that the isochronous transfer is not assured, it is necessary to intermittently control the recording of the VTR. In practice, realization of the dubbing recording becomes impossible. Particularly, in domestic equipment, there is a case where connection between a device which has no relation to the data transfer, and the P1394 cable is erroneously cut off during data transmission.

In this manner, there has been the following problem. Specifically, since, continuity of the data before and after the resetting operation is not assured when the bus is reset, data may be lost or problems may occur during transfer of the synchronous data such as image data or the like.

In view of the above, in P1394 the bus resetting is not generated upon connection or disconnection of the devices. However, in synchronous communication such as P1394, the maximum transfer rate in a transmission system is limited. Accordingly, P1394 limits the number of packets which are transferred in the isochronous cycle, in accordance with the maximum transfer rate. Now, it is assumed that transmission of the data is executed between a plurality of devices at a predetermined transfer rate on the basis of such limitation. Here, in a case where another device is newly connected additionally to the P1394 cable, and a synchronous communication signal is transmitted also with respect to the additionally connected device, it is considered that a total transfer rate exceeds a predetermined total transfer rate. At present, P1394 operation in this case is not prescribed. That is, where another device is newly connected, there is the possibility that transmission of all the data also including data presently being transmitted is stopped. Further, when the transfer of the data is permitted, there is also the possibility that data which are sufficiently transmitted during a predetermined isochronous cycle are transmitted during the subsequent isochronous cycle. Thus, there has been a problem that the synchronous transfer is not assured.

OBJECT AND SUMMARY OF THE INVENTION

It is an object of the present invention to provide a digital interface device which assures synchronous communication to thereby enable certain transfer of synchronous data such as image data or the like.

It is another object of the invention to provide a digital interface method which assures synchronous communication to thereby enable certain transfer of synchronous data such as image data or the like.

According to the invention, there is provided a digital interface device which comprises transmission and receiving means for transmitting transmission data to a bus by a predetermined data format and for receiving data which are transmitted through the bus; transfer-rate computing means for computing information which corresponds to a transfer rate of the transmission data which are practically transmitted by said transmission and receiving means to output the same; insertion means for inserting the information corresponding to said transfer rate to the transmission data from said transmission and receiving means, and to output the same on said bus; total transfer-rate computing means into which the information corresponding to the transfer rate is inputted. The information corresponding to the transfer-rate is inserted in the receiving data which are received by said transmission and receiving means and corresponds to the transfer rate which is outputted by said transfer-rate computing means. The total transfer-rate computing means computes information corresponding to a total transfer rate of data which are transmitted in multiplex on said bus on the basis of information corresponding to the inputted transfer rate. The invention also includes arbitration control means for controlling bus arbitration on the basis of the information corresponding to the total transfer rate.

Further, according to the invention, there is provided a digital interface method comprising a procedure of fetching information corresponding to a transfer rate from data on a bus in which a plurality of data are multiplexed upon each other and which is synchronously transferred at a predetermined synchronous transfer period; a procedure of summing up or totaling information corresponding to the fetched transfer rate to compute information corresponding to a total transfer rate of the data which are transmitted in multiplex onto said bus, and an arbitration procedure of giving a bus use permission right to newly added equipment only in a case where the rate which is given by the information corresponding to said total transfer rate does not exceed the maximum transfer rate which is permitted for said bus in a case where new equipment is additionally connected to said bus.

The other features and advantages of the present invention will become sufficiently apparent from the following detailed description.

BRIEF DESCRIPTION OF THE DRAWINGS

FIGS. 10A–10C are explanatory views for describing operation of the embodiment in FIG. 8;

DETAILED DESCRIPTION OF THE PREFERRED EMBODIMENTS

Figure 1:
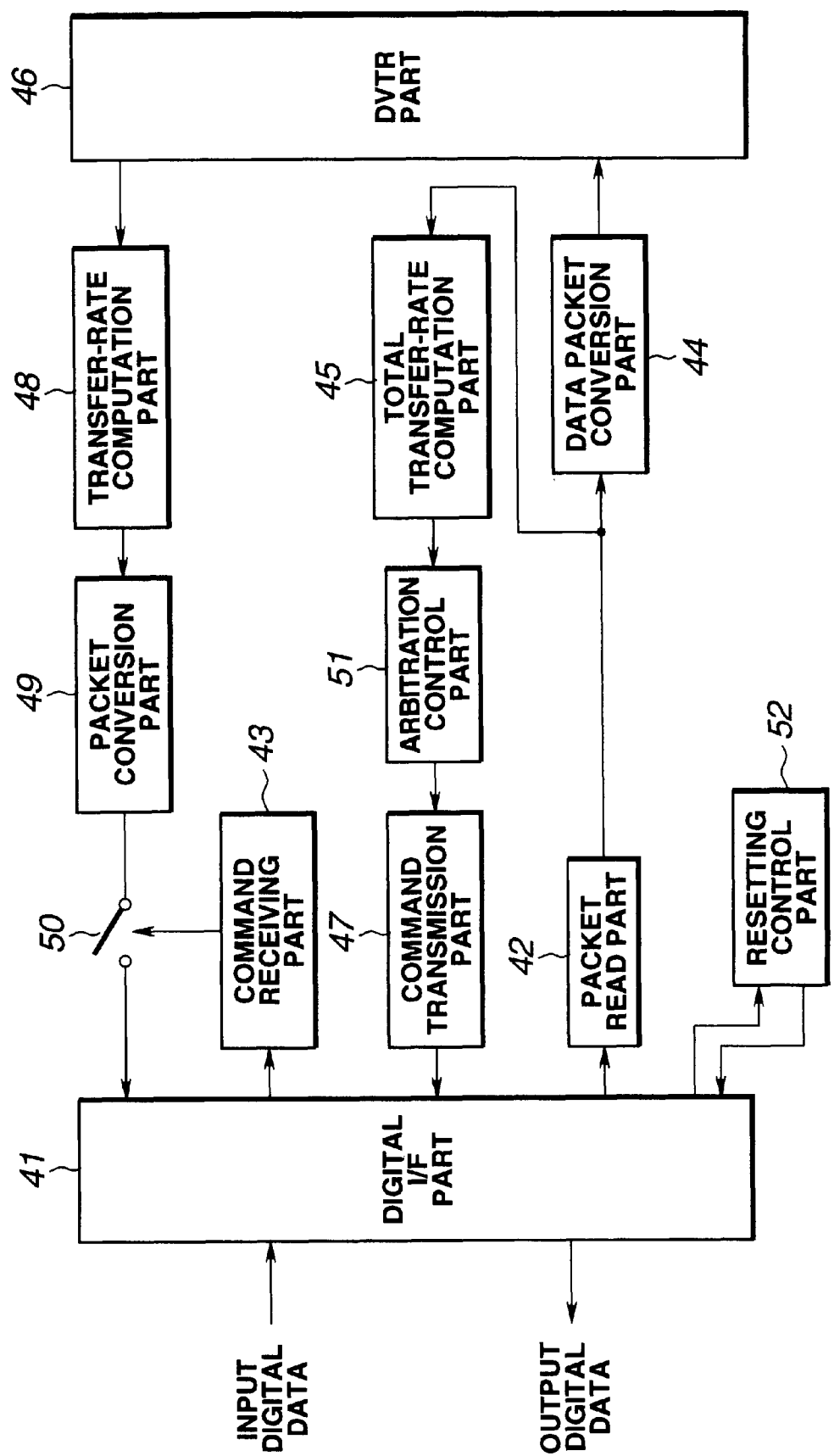
FIG. 1 is a block diagram showing an embodiment of a digital interface device according to the invention.

FIG. 1 is a block diagram showing an embodiment of a digital interface device according to the invention.

A digital I/F part 41 executes transmission and receiving of transmission data. Specifically, the arrangement is such that the digital I/F part 41 receives input digital data which are transmitted through an unshown P1394 cable, for example, to output the received data to a packet read part 42 and a command receiving part 43, and to output transmission data through the unshown P1394 cable as output digital data. The digital I/F part 41 enables data transfer similar to P1304, that is, isochronous transfer (synchronous transfer) and multi-channel transfer.

Specifically, in an interface system in the present embodiment, the data are transferred in synchronism with an isochronous cycle every one hundred and twenty five (125) μsec on a bus similarly to P1394, for example. The data can be transmitted in a bidirectional manner among each device and in multiplex of signals. Moreover, the arrangement is such that asynchronous data such as commands or the like are multiplexed upon gaps between the synchronous data such as image data or the like and are transmitted. In this connection, the data which are transferred on a bus become a packet structure.

The digital I/F part 41 is arranged to have a buffer which retains data at least for the isochronous cycle, and to store the transmission data in the buffer to output the same at a high-speed rate which is permitted to the interface. In this connection, similarly to P1394 also in the present embodiment, three modes including 400 Mbps, 200 Mbps and 100 Mbps may, for example, be used as the maximum transfer rate. In the present embodiment, the maximum transfer rate of the interface is set to a Mbps. In this connection, the digital I/F part 41 is arranged to enable a request command of a bus use right to be transmitted from an unshown command transmission part.

Figure 11:
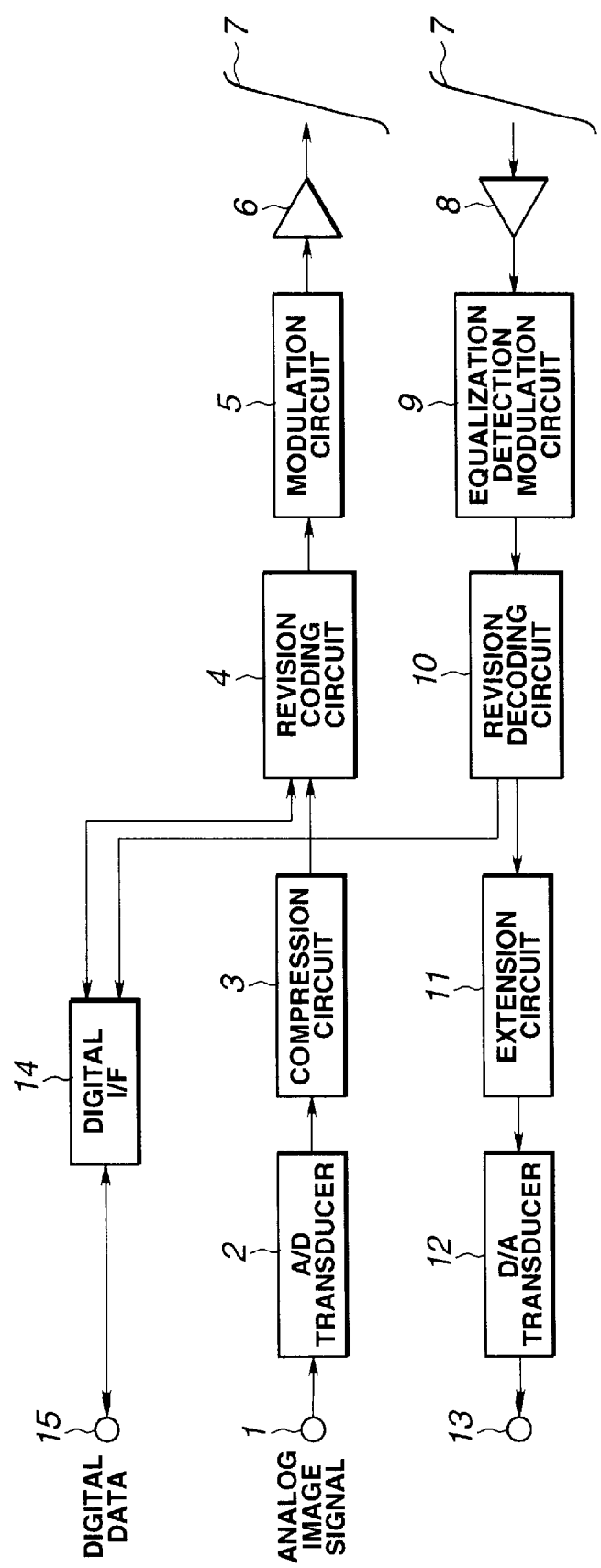
FIG. 11 is a block diagram showing a related technique of a digital interface device which is used in a digital VTR for public welfare.
Figure 12:
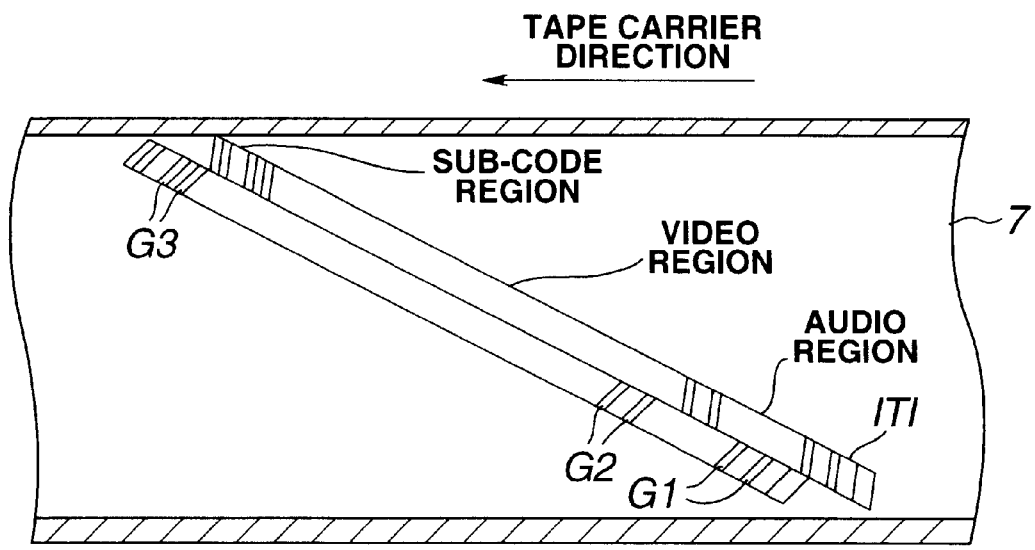
FIG. 12 is an explanatory view showing a recording format of SD and HD standards.
Figure 13:
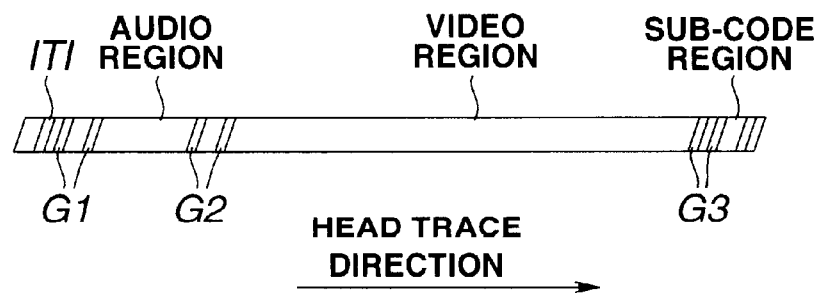
FIG. 13 is an explanatory view showing a recording format of the SD and HD standards.
Figure 15:
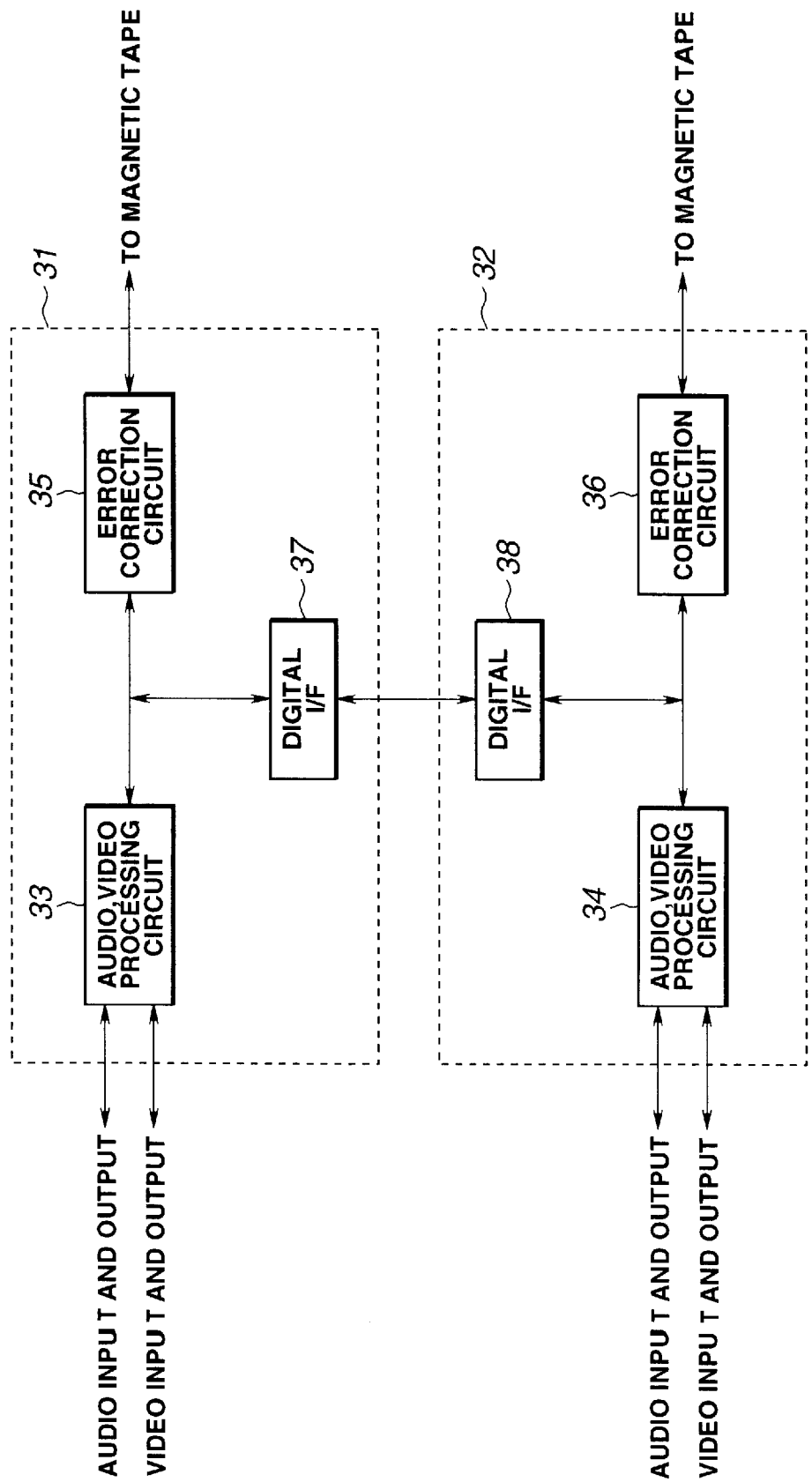
FIG. 15 is a block diagram showing a related technique of a digital interface device which is used in a case where two digital VTRs 31 and 32 are connected to each other.

The packet read part 42 reads the packet of the receiving data to output the same to a data packet conversion part 44 and a total transfer-rate computing part 45. The data packet conversion part 44 converts the receiving packet to a packet unit which is set in the device, for example, to a sink block unit to output the same. FIG. 1 shows an example in which a digital VTR (hereinafter also referred to as "DVTR") part 46 is adopted as part of the device. The DVTR part 46 is arranged similarly to FIG. 11, and is arranged so as to add an error revision code to the data from the data packet conversion part 44 and, thereafter, to apply predetermined modulation processing, so as to be able to record in digital the same onto an unshown magnetic tape. Furthermore, the DVTR part 46 is arranged to reproduce the digital data which are recorded onto the unshown magnetic tape to apply modulation processing and error revision processing thereto and, thereafter, to output the reproduced data to a transfer-rate computing part 48.

The transfer-rate computing part 48 computes the transfer rate of the output data in the DVTR part 46 to output the same to a packet conversion part 49. The packet conversion part 49 converts the data of the transfer rate from the transfer-rate computing part 48 and the output data of the DVTR part 46 into a unit of packets which is set in a transmission path, to output the same to the digital I/F part 41 through a switch 50. The packet conversion part 49 is arranged to insert a transfer rate value into a header within the transmission packet.

Figure 2:
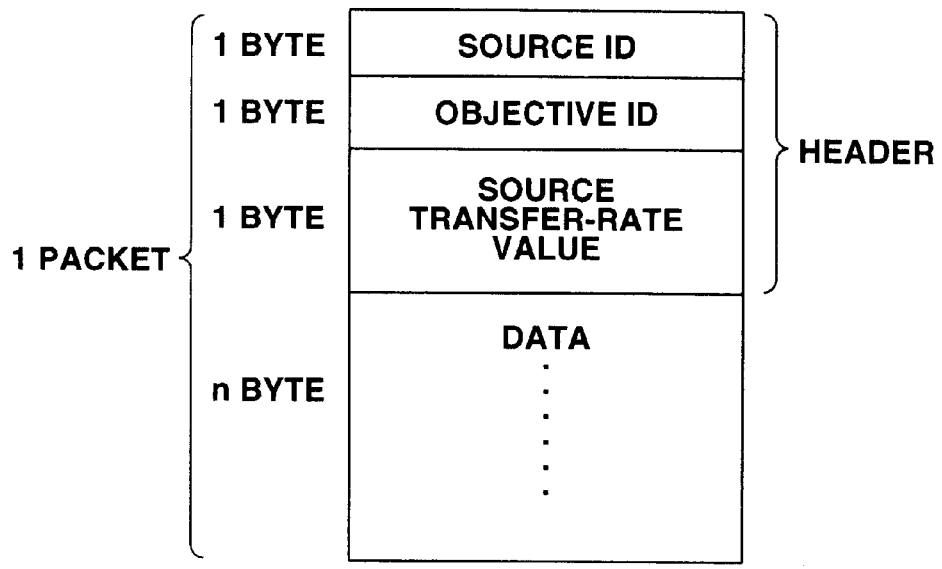
FIG. 2 is an explanatory views for describing a transmission packet in the embodiment.

FIG. 2 is an explanatory view showing an arrangement of the transmission packet from the packet conversion part 49. As shown in FIG. 2, a source ID of the transmission equipment of one (1) byte showing a self-ID is arranged at the head of each packet. Subsequently, an objective ID of one (1) byte showing an ID of a receiving equipment is arranged. The packet is organized such that, at the last portion of the header, a source transfer rate value of one (1) byte is positioned and, subsequently, the data are arranged by n bytes and are transmitted.

A total transfer-rate computing part 45 computes a total transfer rate of the packet data from the packet read part 42, and outputs the same to an arbitration control part 51. Where the request command of the bus use right is received from the unshown command receiving part, the arbitration control part 51 judges whether or not the total transfer rate exceeds the total transfer rate which is set in the transmission path, executes arbitration or mediation of the use right of the bus, to thereby output the arbitration results to a command transmission part 47. The command transmission part 47 generates a command on the basis of the arbitration results, to output the same to the digital I/F part 41.

Further, a command receiving part 43 receives the command from the digital I/F part 41 to control the switch 50 on the basis of the received command. Specifically, command receiving part 43 turns ON the switch 50 where it is shown that the bus use permission right is given by the receiving command, while turns OFF the switch 50 where the bus use non-right is shown.

A resetting control part 52 executes input and output of data which are necessary for the bus resetting, between the same and the digital I/F part 41, to control bus resetting operation. The bus resetting operation is similar to bus resetting of P1394. However, in the present embodiment, when a new device (or equipment) is additionally connected and the connection of the bus is turned OFF, the bus resetting is not executed.

Figure 3:
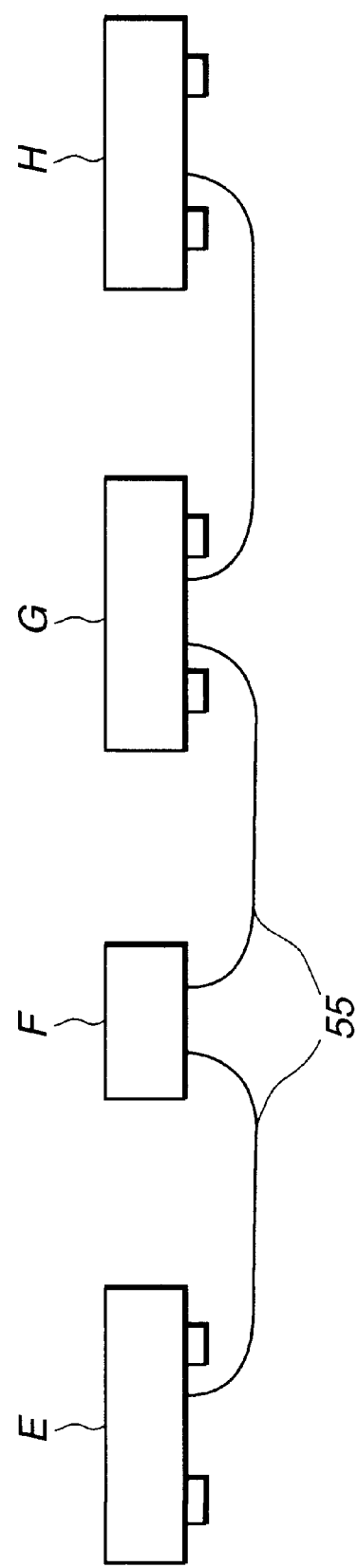
FIG. 3 is an explanatory view for describing operation of the embodiment.
Figure 4:
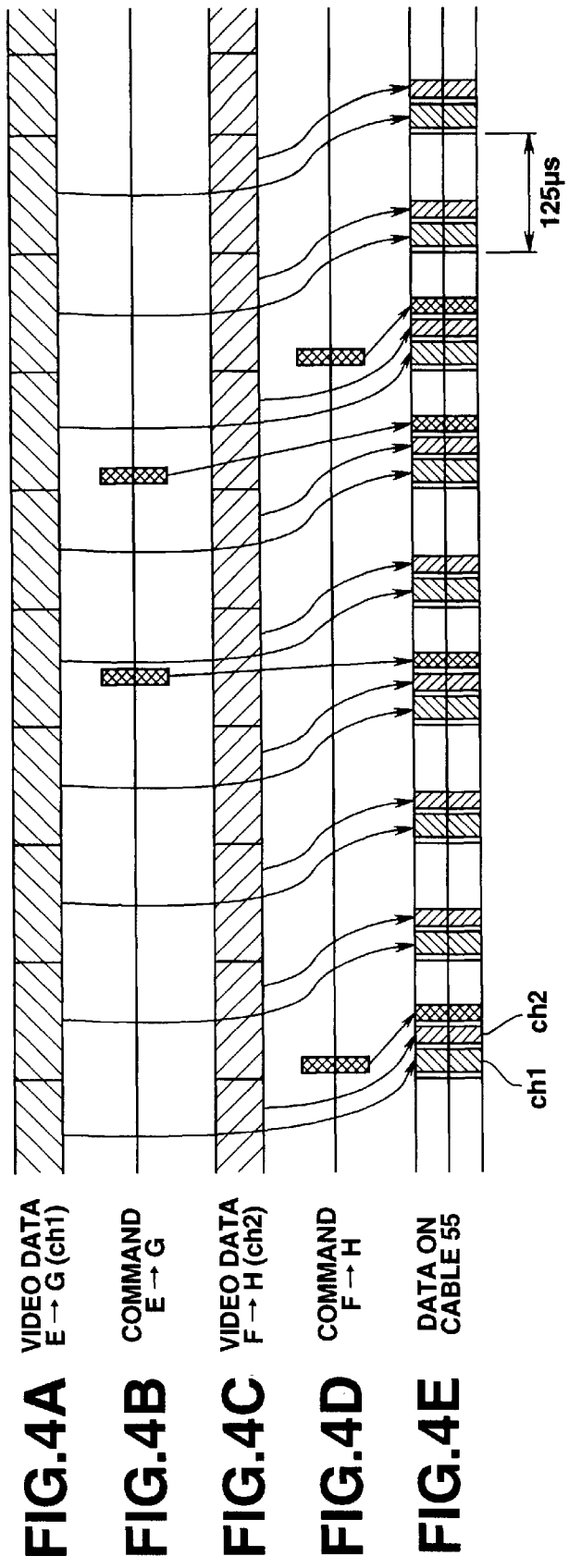
FIGS. 4A–4E are explanatory views for describing operation of the embodiment.
Figure 5:
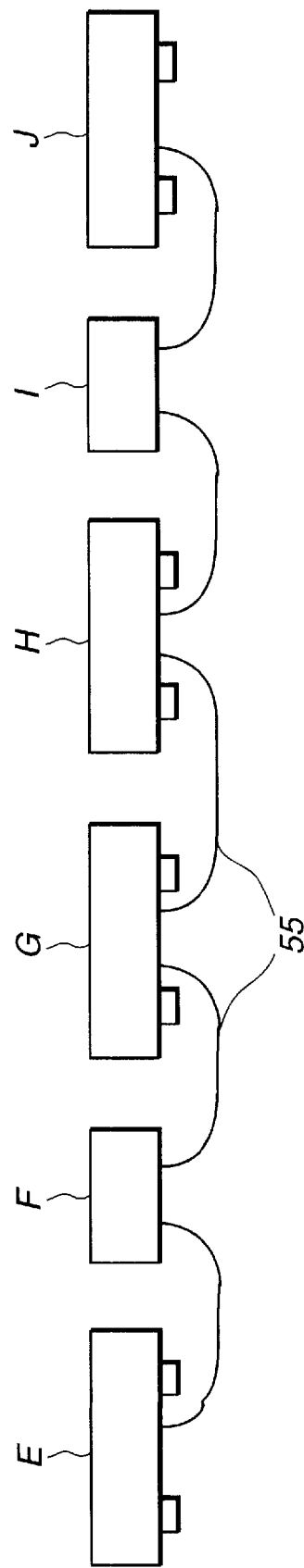
FIG. 5 is an explanatory view for describing operation of the embodiment.

FIG. 3 shows an example in which a plurality of devices E to H which have the digital interface device shown in FIG. 1 are connected to each other through the P1394 cable. Moreover, FIGS. 4A–4E demonstrate data transfer. FIG. 4A shows video stream from device E to device G. FIG. 4B shows a command from device E to device G. FIG. 4C shows a video stream from device F to device H. FIG. 4D shows a command from device F to device H. FIG. 4E shows data on a cable 55. FIG. 5 shows an example in which new devices I and J are connected to each other from a state in FIG. 3. FIGS. 6A–6E show data transfer in a case of FIG. 5. FIGS. 6A to 6E correspond respectively to FIGS. 4A to 4E.

The devices E to H are connected to each other by the cable 55 in the form of a daisy chain. The cable 55 may be a P1394 or similar cable. It is assumed that image data are transferred from the device E to the device G to execute dubbing recording in the device G, and are transferred from the device F to the device H to execute dubbing recording in the device H.

Upon bus initialization, the image data are controlled by the resetting control part 52. First, each of the devices E to H transfer a signal in a bidirectional manner through the cable 55, to decide a parentage. Any one of the devices E to H becomes a parent unit, while the other becomes child units. The parent unit decides an ID number of each equipment, to identify and inform them. In this connection, operation thereof is similar to that which is executed in the interface such as the SCSL or the like. As described above, the data which are transmitted on the bus have a packet structure containing an ID for identification of the transmission equipment is inserted into the header of the packet. Further, an ID (destination ID) of the receiving equipment to identify the equipment receiving the transmission data is also inserted in the packet header. The bus resetting operation is similar to that of the standard of P1394.

Moreover, as described above, a transfer rate value of the output data from each device is also inserted into the header. Here, it is assumed that the device G is the parent unit, and the other devices E, F and H are set as the child units. Prior to transfer of the data, bus arbitration is executed. The digital I/F part 41 of the devices E and F generates the request command of the bus use right. The device G approves of the bus use permission right with respect to the devices E and F. Thus, the devices E and F transmit the video data, respectively.

These video data shown in FIGS. 4A and 4C are transmitted by the ch1 and the ch2 on the cable 55. The packet data from the devices E and F are inputted to the packet read part 42 through the digital I/F part 41 of the devices G and H, respectively. The packet read part 42 extracts the packet.

The data packet conversion part 44 converts the packet data, for example, into the sink block unit to supply the same to the DVTR part 46. The command (FIGS. 4B and 4D) which shows recording simultaneously with these video data is also transmitted. The DVTR part 46 is prescribed in operation by the inputted command, to record in dubbing the received data.

Meanwhile, the packet data from the packet read part 42 of the device G that is the parent unit are also supplied to the total transfer-rate computing part 45. The total transfer-rate computing part 45 reads the transfer rate of each of the channels which are inserted into the header of the packets of the ch1 and the ch2, to compute the total transfer rate. For example, in a case where the transfer rate of the ch1 is b Mbps, and the transfer rate of the ch2 is c Mbps, there is provided (b+c) Mbps as the total transfer rate. Under a state in which the data are correctly transmitted, the total transfer rate (b+c) becomes a value smaller than the maximum transfer rate a. In this connection, in a case where one of the parent unit is a transmission unit, the parent unit adds the one's transfer rate value and the total transfer rate value of the other transmission units, to compute a total transfer rate.

Now, assume that a=100 Mbps, b=50 Mbps, and c=25 Mbps. Then, since the total transfer rate is smaller than the maximum transfer rate, data transfer is normally executed. Here, assume that in order to transmit the image data from the device I which is not connected to the cable 55, to the device J the devices I and J are connected to the cable 55.

FIG. 5 shows a connection state of this case. Through the cable 55, the device H and the device I are connected to each other, and the device I and the device J are connected to each other. In the present embodiment, the resetting control part 52 does not execute bus resetting even if new devices I and J are connected to each other.

In order to supply the image data from the device I to the device J, first, the device I generates a request command of the bus use right. The command is inputted to the digital I/F part 41 of the device G that is the parent unit, through the cable 55. Then, the device G requests sending of the packet (transfer rate packet) in which the transfer rate of the device I is included.

Thus, the device I outputs data which indicate the transfer rate, prior to transfer of the image data. Specifically, the transfer-rate computing part 48 computes the transfer rate of the output data from the DVTR part 46, to output the same to the packet conversion part 49. The packet conversion part 49 packets the data of the transfer rate, to output the same to the digital I/F part 41 through the switch 50. Thus, the transfer rate packet is sent to the cable 55 from the digital I/F part 41.

The total transfer-rate computing part 45 of the device G adds the transfer-rate of the output data from the device I to the total transfer rate before connection of the devices I and J, to compute the total transfer-rate in a case where the output data of the device I are transferred. Since the total transfer-rate before connection of the devices I and J is 75 Mbps, and the maximum transfer rate is 100 Mbps, the remaining scope or room is 25 Mbps. Accordingly, the arbitration control part 51 of the device G controls the command transmission part 47 such that the bus use permission right is given to the device I, if the transfer rate of the ch3 which transmits the image data from the device I is equal to or less than 25 Mbps.

The command transmission part 47 sends the command which gives the bus use permission right, through the digital I/F part 41. The command is inputted to the command receiving part 43 through the digital I/F part 41 of the device I. When the command receiving part 43 receives the command, the command receiving part 43 outputs a control signal for turning ON the switch 50. Thus, the DVTR part 46 of the device I starts reproduction of the image data. The image data from the DVTR part 46 is given to the packet conversion part 49 through the transfer-rate computing part 48. The packet data of the image data are outputted from the packet conversion part 49, and are accumulated or stored in the buffer of the digital I/F part 41.

Meanwhile, the device G that is the parent unit sends a command showing that the transmission of the data is executed during an isochronous period of time in order of the devices E, F and I, after transfer of the data due to the ch2 has been completed. Thus, the digital I/F part 41 of the device I sends the packet data which are stored in the buffer subsequent to the packet data of the ch1 and the ch2, as packet data of the ch3, as shown in FIG. 6E.

Figure 6:
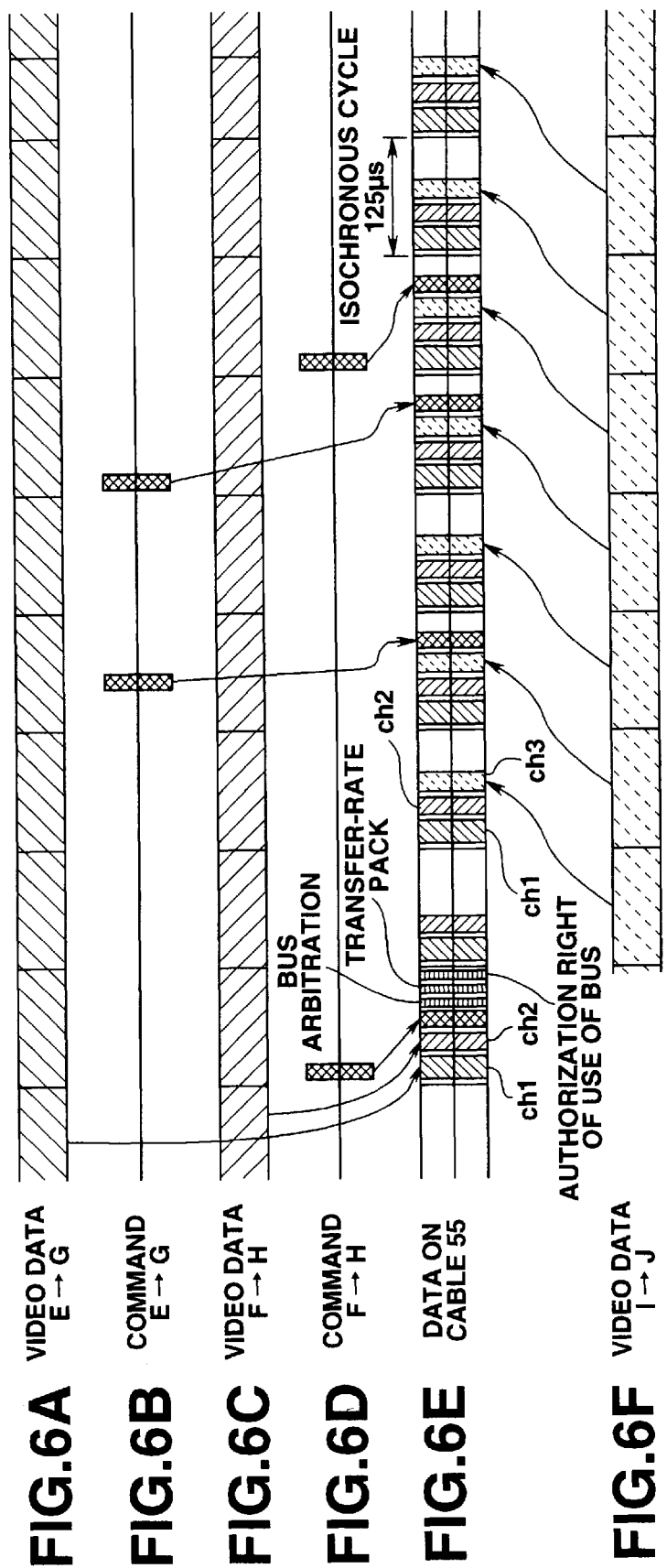
FIGS. 6A–6F are explanatory views for describing operation of the embodiment.

In this manner, while synchronism or synchronization of the transmission of the ch1 and the ch2 until before connection of the devices I and J is maintained, it is possible to multiplex the ch3 during the isochronous period of time to transmit the same, as shown in FIG. 6E.

Meanwhile, when the packet which includes the header indicating the transfer rate which is higher than 25 Mbps is inputted from the device I, with respect to the sending request of the transfer rate from the device G, the device G sends a command which indicates a bus use un-permission or non-permission, to the device I. In this case, the device I does not output the image data. Thus, the synchronous transfer until connection of the devices I and J is maintained.

In this manner, in the present embodiment, also in a case where another piece of equipment is newly connected when the synchronous transfer is taking place, the bus resetting is not executed. When the request command of the bus use right is generated from the newly connected equipment, the parent unit generates a command for sending the transfer rate after termination or completion of transfer of the data which are synchronously transferred, during the predetermined isochronous cycle. The parent unit judges whether or not the total transfer rate which includes the output data from the additionally connected equipment exceeds the maximum transfer rate, to execute the arbitration with respect to the additionally connected equipment. This prevents transmission the output data of the additionally connected equipment, which data exceeds the maximum transfer rate of the transmission path, making it possible to assure the synchronous transfer.

Accordingly, when the data from the additionally connected equipment are asynchronous data, the bus use permission right may be given in spite of the transfer rate. In this case, the asynchronous data are arranged in gaps in the synchronous data and are transferred.

Furthermore, the embodiment in FIG. 1 takes into consideration that any of the devices may become the parent unit. However, when the embodiment in FIG. 1 is adopted only in the child units, the total transfer-rate computing part 45, the arbitration control part 51 and the command transmission part 47 may be omitted.

The device which receives the bus use non-permission command from the parent unit cannot transfer the data onto the bus. Specifically, even if the user newly connects the P1394 connector of the predetermined equipment to the bus, the data may not always be transferred from the equipment onto the bus. In this case, the user is notified that the data cannot be transferred onto the bus. There may also be situations where the user does not take notice of the fact that the data are not transferred. In that case, it is necessary for the user to investigate why the data are not transferred.

Figure 21:
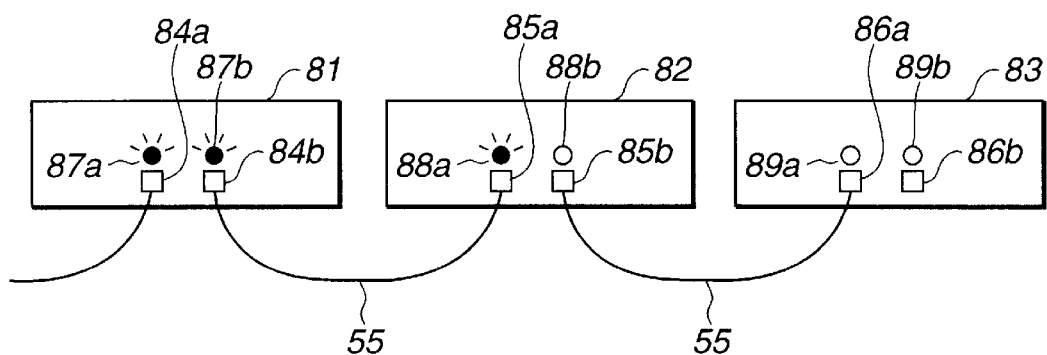
FIG. 21 is an explanatory view showing another aspect of the embodiment in FIG. 1.

FIG. 21 is an explanatory view showing an example of a notification method.

It is assumed that two units 81 and 82 are connected through the P1394 cable 55. Next, assume that new unit 83 is connected. Connector parts 84a and 84b to 86a and 86b of the respective units 81 to 83 with respect to the P1394 cable 55 are provided respectively with LEDs 87a and 87b to 89a and 89b.

The LEDs 87a and 87b to 89a and 89b are controlled by the parent unit, and are turned ON only in a case where the bus use permission right is given thereto. Specifically, it is indicated that the LEDs 87b and 88a which are provided respectively on the connector parts 84b and 85a which connect units 81 and 82 to each other are turned ON, and units 81 and 82 are together capable of transferring the data.

Alternatively, it is assumed that the bus use non-permission command is inputted to the equipment 83 which is newly connected. In this case, the LED 89a which is provided on the connector part 86a of the newly connected unit 83, and the LED 88b of the connector part 85b of the unit 82 to which the unit 83 is connected are not turned ON.

In this manner, depending upon whether or not the LED is turned ON, the user can easily know whether data transfer through the bus is impossible.

Figure 22:
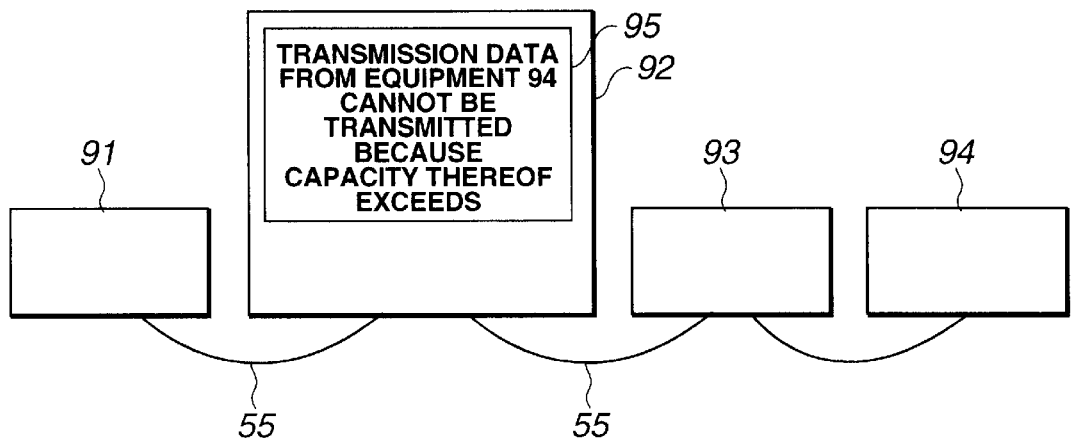
FIG. 22 is an explanatory view showing another aspect of the embodiment in FIG. 1.

Moreover, the arrangement may be such that the parent unit displays a connection state, right or wrong of the transfer, on a display part, such as a monitor. FIG. 22 is an explanatory view showing such an example.

Next, assume that units 91 to 93 are connected through the cable 55. In this connection, unit 91 is the parent unit, while unit 92 contains a display part 95. Also assume that unit 94 is newly connected. Then, when the parent unit 91 outputs the bus use non-permission command to unit 94, the parent unit 91 simultaneously controls unit 92 to cause the same to display a warning display something to the effect of "the transmission data from unit 94 cannot be transmitted because capacity is exceeded" on the display part 95.

Thus, the user can know whether or not the data are capable of being transferred from the newly connected equipment, only by the fact that the equipment is connected to the bus.

Figure 23:
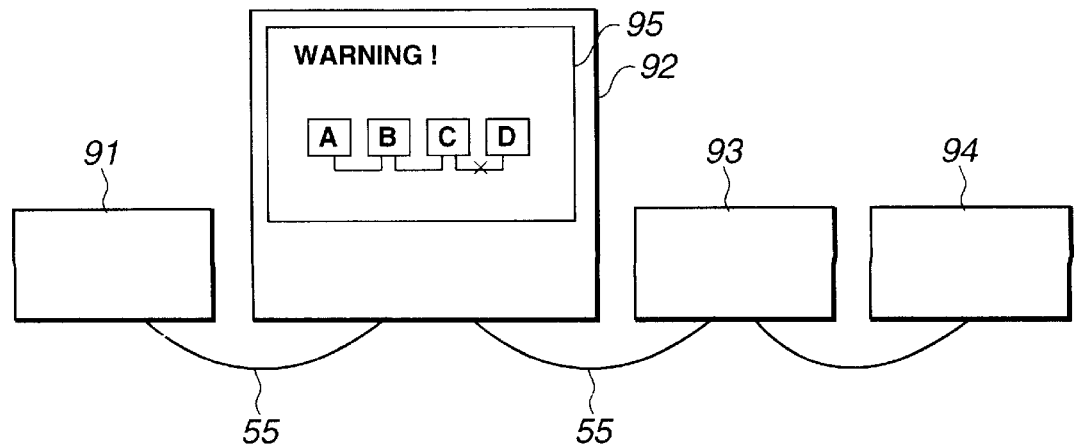
FIG. 23 is an explanatory view showing the other aspect of the embodiment in FIG. 1.

Furthermore, FIG. 23 is an explanatory view showing an example of another warning display.

In FIG. 23, the parent unit 91 graphically displays the connection state, the right or wrong of the transfer, and the like, on the display part 95 of the equipment 92. A portion to which an x mark is applied on the cable shows that the data transfer is impossible. Also in this configuration, the user can easily know from the image plane display whether the transfer of the data is possible.

Figure 7:
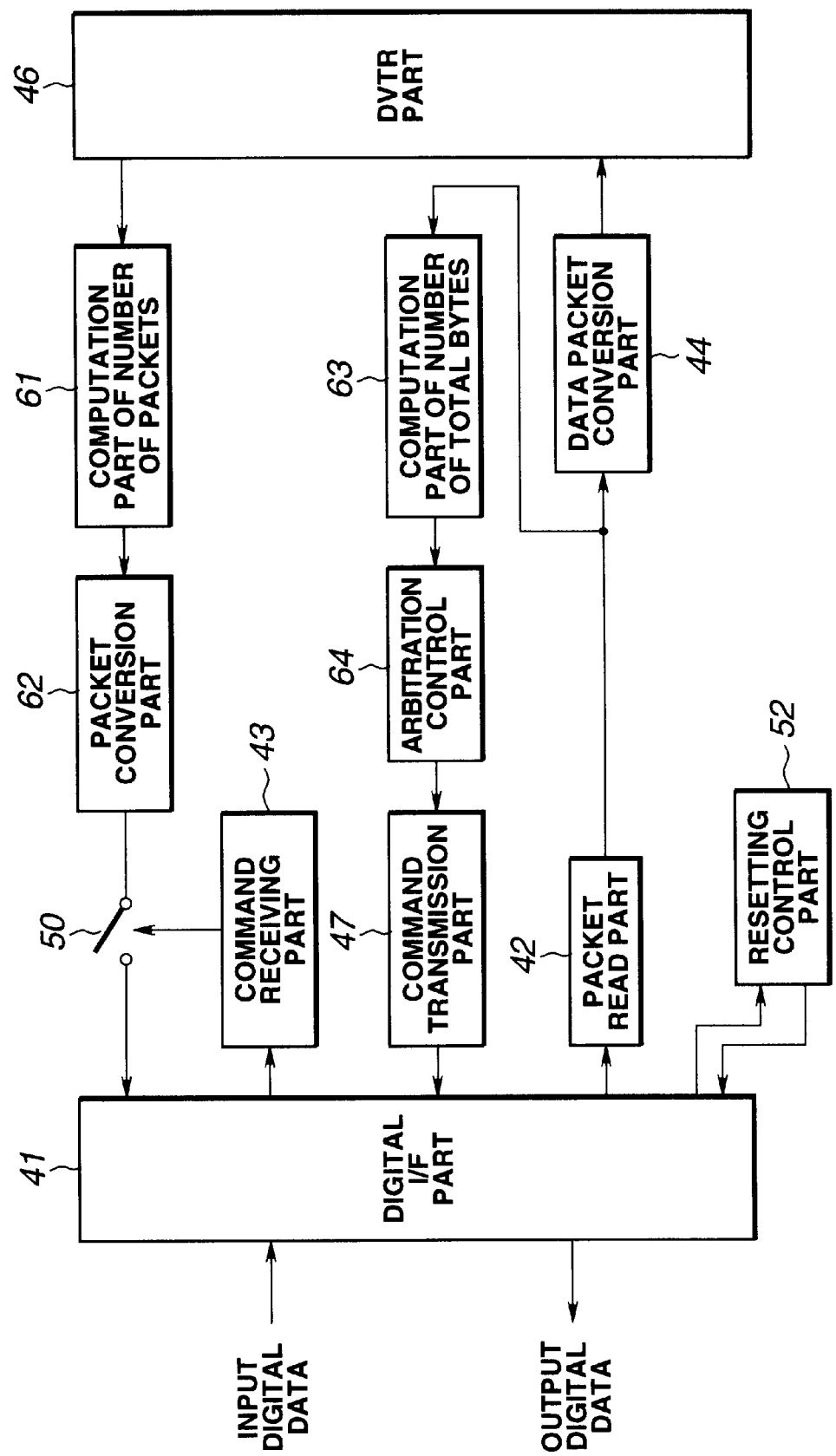
FIG. 7 is a block diagram showing another embodiment of the invention.

FIG. 7 is a block diagram showing another embodiment. In FIG. 7, the same reference numerals are applied to the corresponding elements of FIG. 1, and the description thereof will be omitted.

In the embodiment in FIG. 1, the determination has been executed with respect to the additionally connected equipment on the basis of whether or not the total transfer rate exceeds the maximum transfer rate. However, a method is also considered which executes the arbitration or determination on the basis of whether or not the total transfer rate exceeds the number of packets which is permitted for the interface. For example, where the capacity of the buffer which is provided in the digital I/F part of each of the unit is relatively small or low, it is better to execute control on the basis of the number of packets, than executing control on the basis of fine transfer rate.

Figure 16:
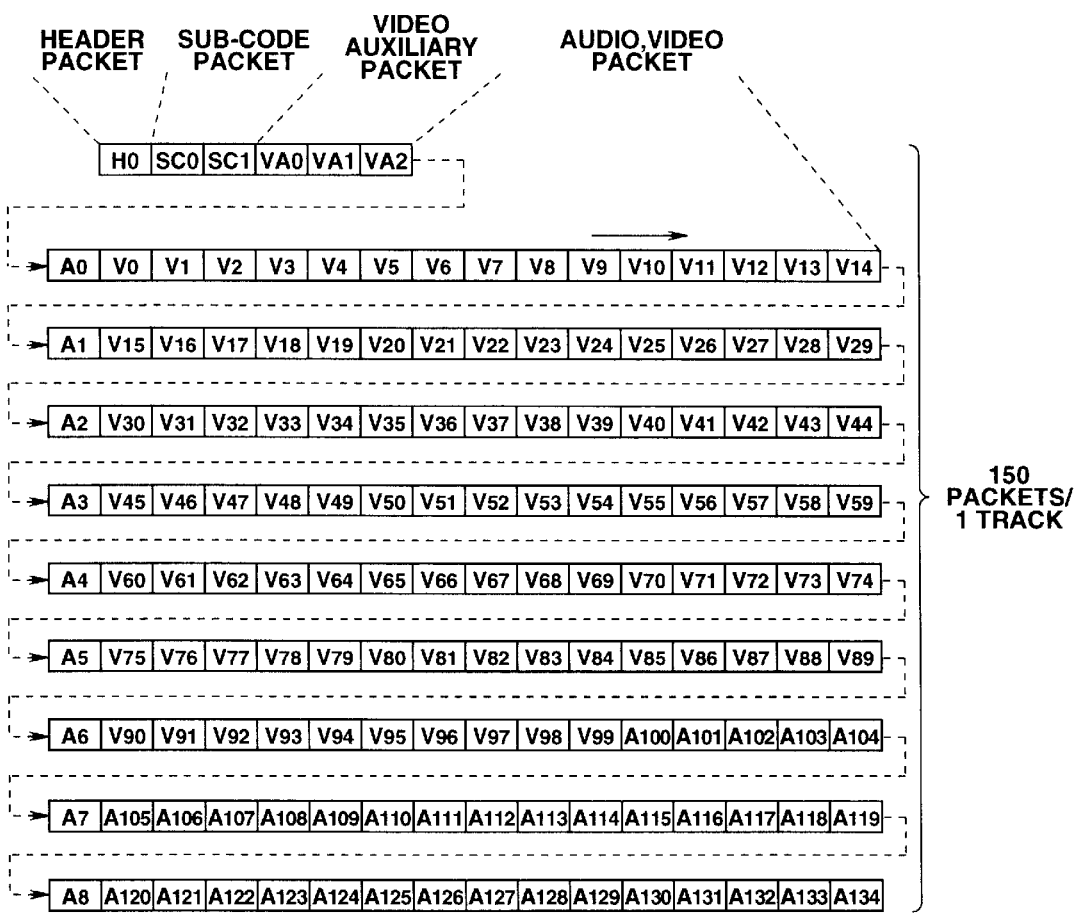
FIG. 16 is an explanatory view showing packet data which correspond to one (1) track in the SD and HD standards.
Figure 17:
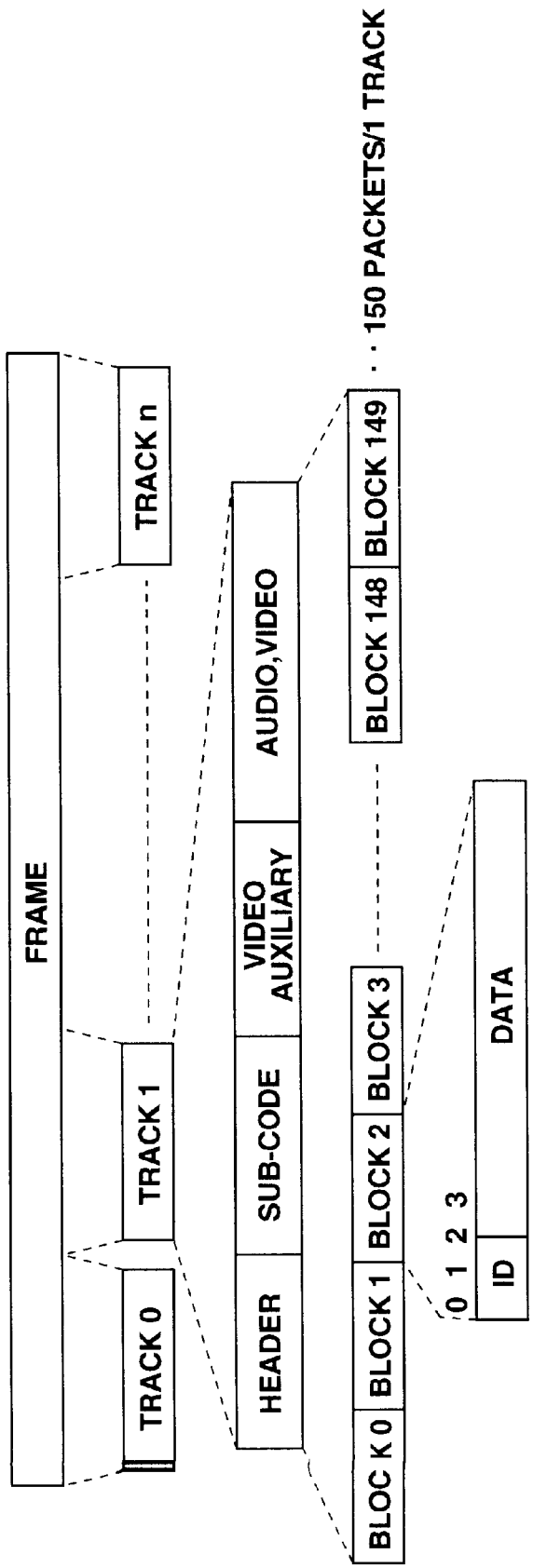
FIG. 17 is an explanatory Clew showing data structure of the SD and HD standards.
Figure 18:
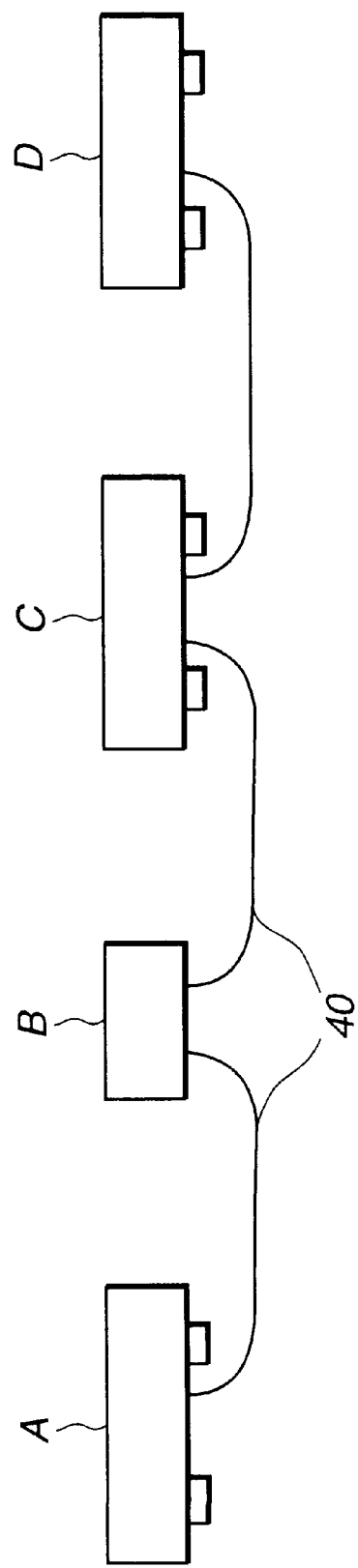
FIG. 18 is an explanatory view for describing an interface system of P1394.
Figure 19:
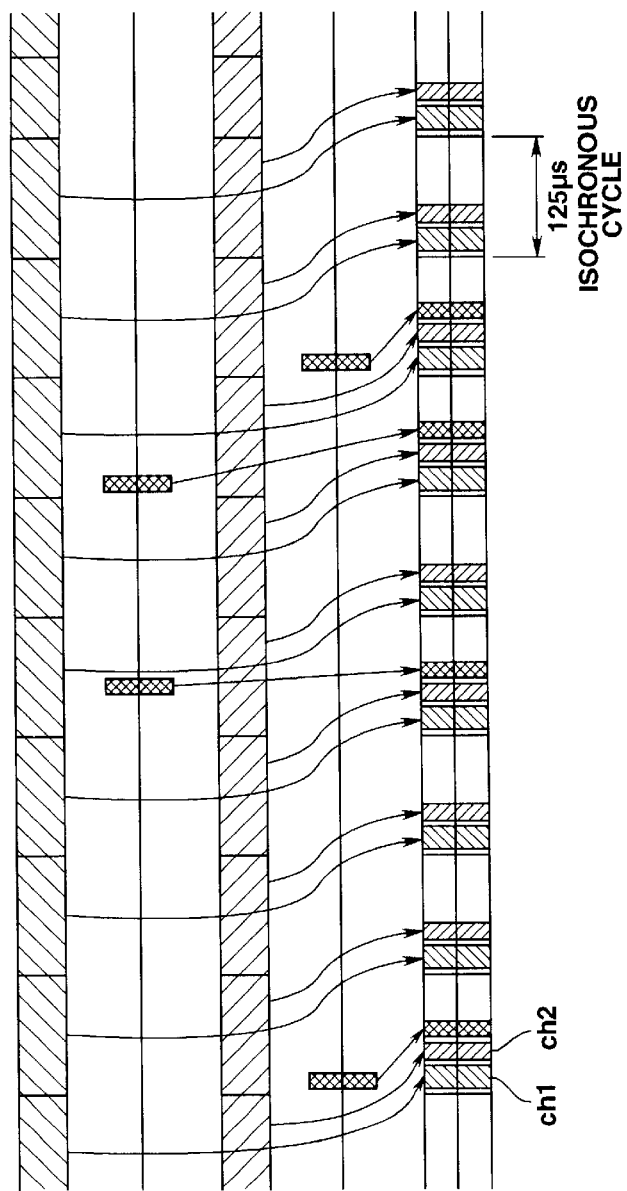
FIGS. 19A–19E are explanatory view for describing the interface system of P1394.

For example, in the digital VTR of the SD and HD standards, the data for one (1) track which are formed on the magnetic tape are converted to one hundred and fifty (150) packets, and transmitted, as shown in FIG. 16. Generally, since the recording and reproducing rates of the digital VTR are constant, where the reproduced image data are transmitted and recorded, it is necessary to generally coincide the reproducing time and the recording time with each other, unless it has a buffer which has a bulk capacity. Specifically, upon dubbing recording, it is necessary to generally transfer data for one (1) track (frame) through a digital interface, in reproducing time for one (1) track (frame) of the magnetic tape. Further, it is necessary to generally record transferred data for one (1) track (frame), in time through which data for one (1) track (frame) is transferred through the digital interface.

Since, in the SD and HD standards, data for one (1) frame are so arranged as to be recorded on ten (10) tracks, data for one (1) track should be transmitted during a 1/10 frame period of time, i.e., during a period of time of about 33 ms (millisecond). This period of time corresponds to a 26.6 isochronous cycle of P1394. Accordingly, in a case where it is applied to the SD and HD standards, data for one (1) track of the digital VTR, that is, one hundred and fifty (150) packets should be transmitted by about twenty six (26) isochronous cycles.

The maximum number of packets transmittable in one (1) isochronous cycle is decided by the number of bytes of one (1) packet and the maximum transfer rate of the interface. Accordingly, in a case of being applied to the SD and HD standards, one hundred and fifty (150) packets should be transmitted in twenty six (26) isochronous cycles, and the number of packets in one (1) isochronous cycle should be set to a value equal to or less than the maximum number of packets. In this connection, the number of packets which is transmitted in each isochronous cycle may be changed every isochronous cycle.

For example, if the maximum transfer rate is 100 Mbps, about 1602 bytes can be transmitted in one (1) isochronous cycle. Moreover, since the packet length in the SD and HD standards is 80 bytes, it is possible to transmit twenty (20) packets in one (1) isochronous cycle. Where the data of the SD and HD standards are transferred, if they do not exceed twenty (20) packets of the maximum number of packets, the number of packets which is allocated to each of twenty six (26) isochronous cycles can suitably be set. For example, six (6) packets are transmitted by twenty five (25) isochronous cycles in twenty six (26) isochronous cycles (25×6=150). A method in which the packets of the SD and HD data are not transmitted is also possible in one (1) isochronous cycle Furthermore, a method is also possible in which packets are transmitted for six (6) packets in twenty (20) isochronous cycles (20×6=120), and packets are transmitted for five (5) packets in six (6) isochronous cycles (6×5=30). A method is also possible in which packets are transmitted for fifteen (15) packets in ten (10) isochronous cycles, and packets are not transmitted in the remaining sixteen (16) isochronous cycles.

In this manner, the number of transmission packets can be set depending upon each unit. However, in a case where a plurality of units simultaneously execute transfers, if each unit individually executes control of the number of transmission packets, there is the possibility that the sum or total of the number of packets which is transferred in a predetermined one (1) isochronous cycle period of time increases more than the maximum number of packets. Then, only data from the unit which is high in priority are transferred, but data of the unit which is low in priority are not transferred. Thus, the buffer of the image data will be overflown or underflown.

In view of the above, in the present embodiment, the arrangement is such that arbitration is executed in accordance with the number of transmission packets from each unit, whereby synchronous transfer is assured.

In FIG. 7, the reproducing data from the DVTR part 46 are supplied to a number-of-packets computing part 61. The number-of-packets computing part 61 computes the number of packets of the output data from the DVTR part 46, which are transferred per a predetermined period of time, for example, per one (1) block period of time, for example, to output the same to a packet conversion part 62. The packet conversion part 62 converts the data of the number of packets from the transfer-rate computing part 61 and the output data of the DVTR part 46, to a packet unit which is set in the transmission path, to output the same to the digital I/F part 41 through the switch 50. Moreover, the packet conversion part 62 is so arranged as to insert the number of packets, the number of bytes of one (1) packet, and the like, into the header within the transmission packet.

Figure 8:
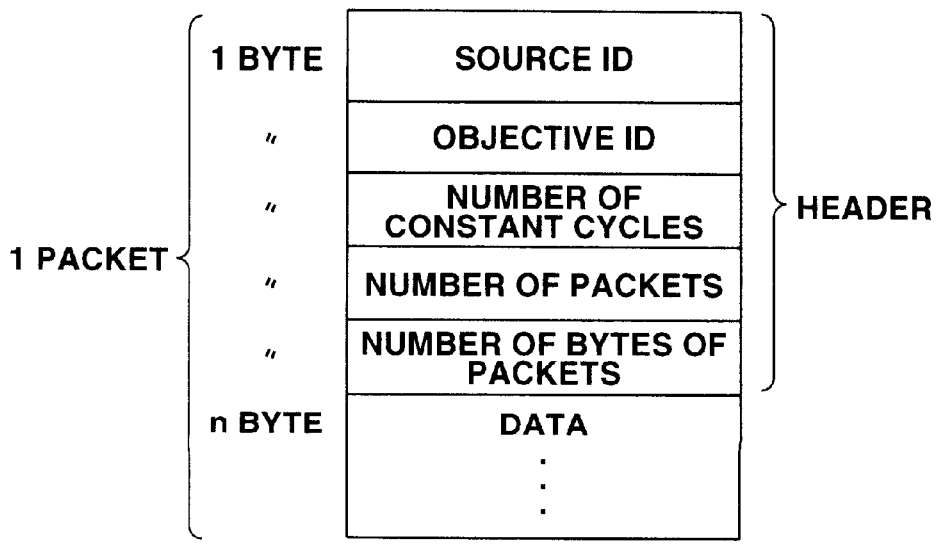
FIG. 8 is an explanatory view for describing a transmission packet in the embodiment in FIG. 7.

FIG. 8 is an explanatory view showing an arrangement of the transmission packets. As shown in FIG. 8, a source ID of one (1) byte which shows a self-ID is arranged at the head of each packet. Subsequently, an objective ID of one (1) byte is arranged. Next, the number of constant cycles of one (1) byte is arranged which shows the above-described predetermined period of time, for example, the period of time of one (1) block, that is, the period of time of about twenty six (26) cycles. Subsequently, the number of packets is arranged which is bans erred in a period of time shown by the number of constant cycles. In the last position of the header, the number of bytes of one (1) packet is located and is transmitted.

A total number-of-bytes computing part 63 computes the number of packets in a period of time shown by the number of constant cycles, from the packet data from the packet read part 42, and the total number of bytes transferred in this period of time, from the number of bytes of the packet, to output the same to an arbitration control part 64. The arbitration control part 64 has the arbitration function of judging whether or not the total number of bytes exceeds the maximum total number of bytes which is set in the transmission path, in a case where the arbitration control part 64 receives the request command of the bus use right, from an unshown command receiving part, to execute arbitration of the use right of the bus, to thereby output arbitration results to the command transmission part 47. In this connection, the arbitration control part 64 of the parent unit sets the period of time shown by the number of constant cycles and the number of packets which is transferred during the isochronous cycle period of time, to another child unit.

Subsequently, operation of the embodiment arranged as described above will be described smith reference to explanatory views of FIG. 9 and FIGS. 10A~10C.

Now, it is assumed that under the connection state in FIG. 3, the packet data of the SD and HD standards are already transmitted by the ch1 and the ch2. In this connection, it is assumed that the parent unit is the device G, and the data are transferred from the device E to the device G and from the device F to the device H. The transferred packet data must be transmitted by one hundred and fifty (150) packets in twenty six (26) isochronous cycles, as described above. In this connection, in practice, since one (1) block period of time is 26.6 isochronous cycle periods of time, it is necessary to transmit by one hundred and fifty (150) packets in twenty seven (27) isochronous cycles with a predetermined period.

Figure 9:
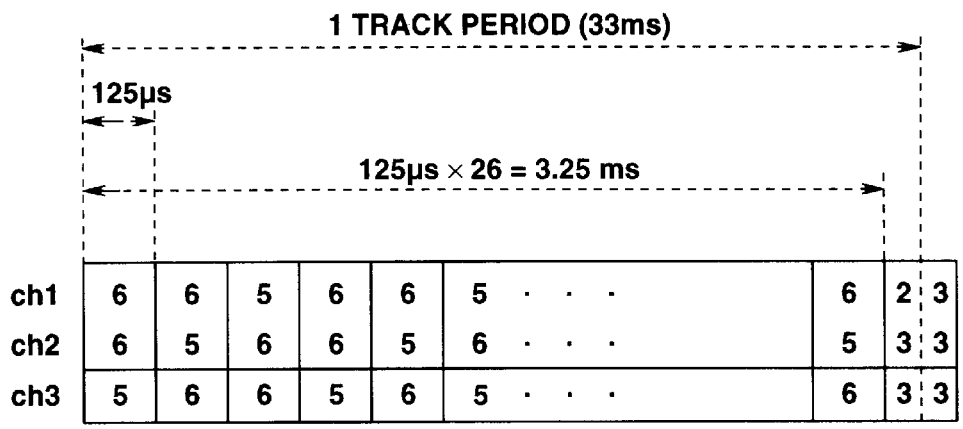
FIG. 9 is an explanatory view for describing operation of the embodiment in FIG. 7.
Figure 14:
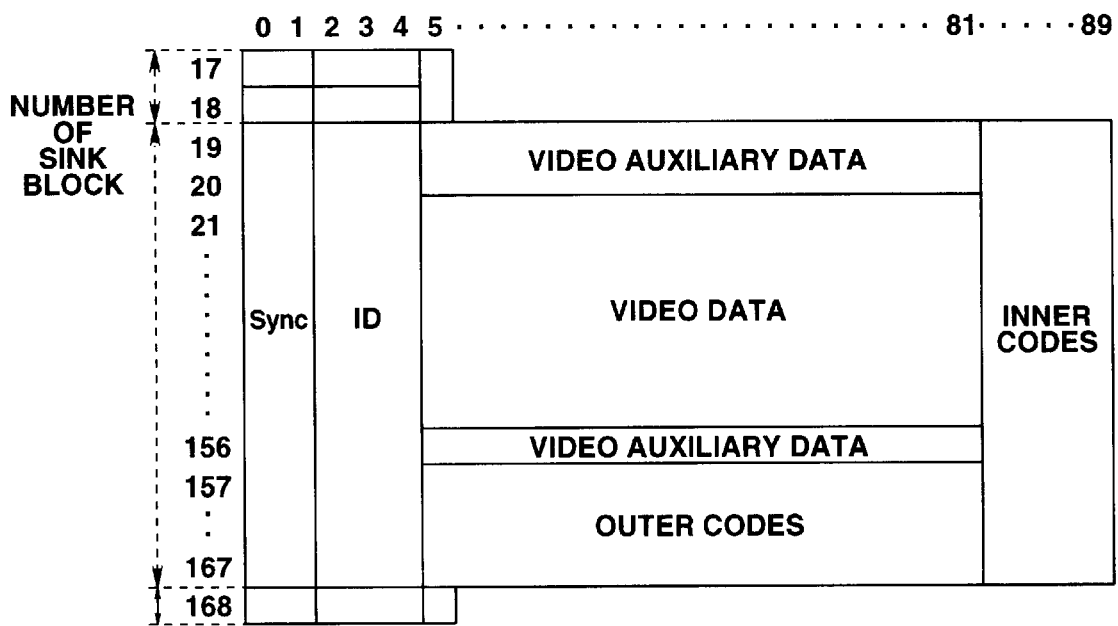
FIG. 14 is an explanatory view showing a recording format of the SD and HD standards.

The device G that is the parent unit outputs indication of the number of transmission packets such that the total number of packet data from the devices E and F becomes equal to or less than twenty (20) packets/isochronous cycle, for example. Thus, the devices E and F output the packet data of the number of packets shown in FIG. 9 to the ch1 and the ch2, respectively. In this connection, FIG. 9 shows an example in which the number of transmission packets from the devices E and F is set to eleven (11) or twelve (12) packets/isochronous cycle. Moreover, the right end in FIG. 9 shows that five (5) or six (6) packets are divided by the twenty-sixth and twenty seventh isochronous cycles and are transferred.

Here, it is assumed that the devices I and J are newly connected additionally so as to be made to the connection state in FIG. 5. Furthermore, it is assumed that the device I generates the request command of the bus use right in order to use the ch3 to transfer the image data of the SD and HD standards. First, the device G transmits data including the number of constant cycles, the number of packets and the number of bytes of one (1) packet to the device I. It is assumed that as indicated by the packet header from the device I, the number of constant cycles is twenty six (26) isochronous cycles, the number of packets is one hundred and fifty (150) packets, and the number of bytes of one (1) packet is eighty (80) bytes/packet.

The total number-of-bytes computing part 63 adds the number of bytes of the packet data of the device I to the total number of bytes due to the devices E and F, to compute the total number of bytes. The arbitration control part 64 judges whether or not the total number of bytes exceeds the number of bytes (26×1602) which is transmittable by twenty six (26) isochronous cycles.

In this case, since the number of bytes which is computed by the total number-of-bytes computing part 63 is 150×80×3 bytes, the arbitration control part 64 permits data transfer of the device I. Thus, the command transmission part 47 outputs the command indicating the bus use permission right, through the digital I/F part 41. Furthermore, the arbitration control part 64 controls the number of transfer packets of the device I such that the total number of packets per one (1) isochronous cycle does not exceed twenty (20). For example, the arbitration control part 64 executes control such that the total number of packets of the devices E, F and I becomes sixteen (16) or seventeen (17) packets/isochronous cycle as shown in FIG. 9.

In this manner, in the present embodiment, the arbitration and the number of transmission packets are controlled on the basis of the number of constant cycles, the number of packets and the number of bytes of one (1) packet. Also in a case where additional connection is executed, it is possible to assure the synchronous transfer. In this connection, the example in FIG. 9 can also cope with the interface in which the maximum number of packets which is transmittable in one (1) isochronous cycle is seventeen (17).

Further, FIG. 9 describes the example in a case where the packet lengths of the output packets from each device are all common to each other. However, it will be clear that the packet lengths of the output packets from each device may not be common to each other. FIGS. 10A~10C show an example of this case.

FIGS. 10A~10C show the example in which the packet data of the SD and HD standards are transmitted in the ch1, and the packet data of the other video format are transmitted in the ch2 and the ch3. FIGS. 10A to 10C show the packet data which are transmitted respectively by the ch1 to the ch3. In ch1, six (6) packets are transmitted during one (1) isochronous cycle period of time, two (2) packets are transmitted during one (1) isochronous cycle period of time in ch2, and eleven (11) packets are transmitted during one (1) isochronous cycle period of time in the ch3. The number of transmission bytes in each isochronous cycle period of time is equal to or less than the maximum number of bytes which is permitted in the isochronous cycle. Also in this case, the synchronous transfer is assured.

In connection with the above, the present invention is made to P1394 as the example. However, it is apparent that the present invention can be applied to the other systems which are capable of executing synchronous transfer. Moreover, the isochronous cycle should not be limited to 125 $\mu$s.

Figure 20:
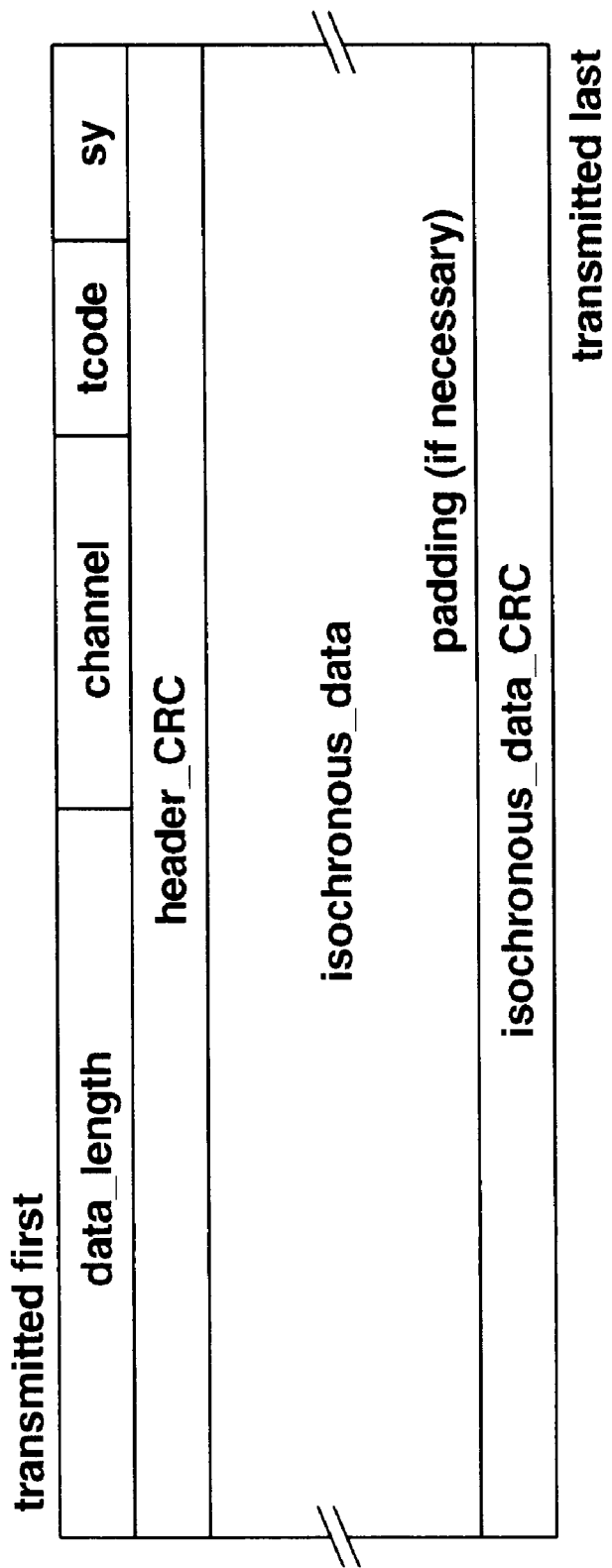
FIG. 20 is an explanatory view showing an isochronous format of a P1394 standard.

Further, in the actual or practical standard of P1394, the isochronous format shown in FIG. 20 is adopted. As shown in FIG. 20, the isochronous format has a header part at the head of the packets and, subsequently, has a data part. The header part has data_length, channel, tcode, sy, and a header_CRC for error correction thereof. Moreover, also the data part has isochronous_data_CRC for error correction.

P1394 is arranged such that, in an asynchronous transfer mode, an objective 1D and a source 1D are assigned to decide a channel to be received by a predetermined equipment, and, in a synchronous transfer mode, a channel in a header part is referred to whereby it is judged whether or not data are data to be received. In this manner, in the isochronous packets of the P1394 standard, the objective ID and the source ID are not provided at the header part. Also in this case, information of the transfer rate of data which are transferred actually is arranged at the head of the data part which is indicated in a slash part in FIG. 20, whereby it is clear that the present application can be applied thereto.

In the present invention, it is apparent that exemplifying embodiments differ in a wide range from each other and can be formed on the basis of this invention without departing from the spirit and the scope of the invention. This invention is not restricted by any specific embodiment except being limited by the appended claims.

What is claimed is:

1. A digital interface device comprising:

transmission and receiving means for transmitting transmission data to a bus by a predetermined data format, and for receiving transmitted data from the bus;

means for computing a first transfer rate of the transmission data;

means for inserting the first transfer rate into the transmission data and means for outputting the transmission data having the transfer rate onto the bus;

total transfer-rate computing means for receiving the first transfer rate, and based on the received first transfer rate, for computing a total transfer rate of data which are transmitted in multiplex on said bus; and means for controlling bus usage right on the basis of the total transfer rate, including controlling usage right without initializing the bus network even if new equipment is additionally connected to the bus during data transmission through the bus.

2. A digital interface device according to claim 1, wherein information corresponding to said first transfer rate is transfer-rate data which indicates a transfer rate of said transmission data.

3. A digital interface device according to claim 1, wherein information corresponding to said first transfer rate is data corresponding to the number of packets of said transmission data.

4. A digital interface device according to claim 1, wherein said means for controlling bus usage right outputs control data for controlling the transfer rate of data transmitted in multiplex on the bus.

5. A digital interface device according to claim 1, wherein said transmission and receiving means is capable of executing synchronous transfer with a predetermined synchronous transfer period, through said bus.

6. A digital interface device according to claim 5, wherein said means for controlling usage right outputs control data for controlling the number of transfer bytes per said synchronous transfer period of each data which are transmitted in multiplex on said bus.

7. A digital interface device according to claim 6, wherein said means for controlling usage right controls the number of transfer bytes per synchronous transfer period, on the basis of the number of packets in a predetermined period of time and the number of bytes per one packet.

8. A digital interface device according to claim 1, wherein said means for controlling usage right is provided with means for notifying the user upon connection of new equipment to the bus, that the new equipment is not permitted to use the bus on the basis said total transfer rate.

9. A digital interface method comprising:
fetching information corresponding to a transfer rate, from data on a bus in which a plurality of data are multiplexed upon each other and which are synchronously transferred by a predetermined synchronous transfer period;
totaling the information corresponding to the fetched transfer rate, to compute information corresponding to a total transfer rate of data which are transmitted in multiplex on said bus; and
giving a bus use permission right to a newly added unit according to an arbitration procedure only when the total transfer rate does not exceed the maximum transfer rate which is permitted to the bus if the new unit were additionally connected to the bus.

10. A digital interface method according to claim 9, wherein said arbitration procedure gives the bus use permission right to asynchronous data in spite of the information corresponding to said total transfer rate.

11. A digital interface method according to claim 9, wherein said arbitration procedure comprises:
receiving a request command of a bus use right from said new equipment;
requesting information corresponding to a transfer rate of said new equipment;
adding the information corresponding to the transfer rate from said new equipment and the information corresponding to the total transfer rate of the data which have already been transmitted through the bus, to each other; and
judging whether or not a rate which is given by the information corresponding to the total transfer rate which is obtained by this addition exceeds the maximum transfer rate which is permitted for the bus.

12. A digital interface method according to claim 9, wherein said arbitration procedure comprises:
receiving a request command of a bus use right from said new equipment;
requesting the number of packets in a predetermined period of time and the number of bytes per a single packet of said new equipment; and
issuing use permission or non-permission of the bus on the basis of the number of packets in a predetermined period of time and the number of bytes per a single packet from said new equipment and the number of packets and the number of bytes per a single packets in a predetermined period of time of each data which are transmitted through the bus, and of deciding the number of transmission packets per said predetermined synchronous transfer period of each of said data to output the same.

13. A digital interface method according to claim 11, wherein said requesting information which corresponds to said transfer rate is executed after completion of transfer of all the data to be transferred in said predetermined synchronous transfer period.

14. A digital interface method according to claim 9, wherein said arbitration procedure causes the synchronous transfer to continue although the bus is not reset upon connection of a new unit to said bus and also where connection of a part of said bus is turned off.

15. A digital interface method according to claim 9, wherein said arbitration procedure is provided with means for notifying the user when said new equipment is not permitted to use the bus.

* * * * *